United States Patent
Patil et al.

(10) Patent No.: US 7,475,344 B1
(45) Date of Patent: Jan. 6, 2009

(54) GENDERS-USAGE ASSISTANT FOR COMPOSITION OF ELECTRONIC DOCUMENTS, EMAILS, OR LETTERS

(75) Inventors: Sandeep Ramesh Patil, Pune (IN); Venkat Venkatsubra, Austin, TX (US); Dwip N Banerjee, Austin, TX (US); Ranadip Das, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/114,812

(22) Filed: May 4, 2008

(51) Int. Cl.
*G06F 17/00* (2006.01)
*G06F 3/00* (2006.01)

(52) U.S. Cl. .................. 715/271; 715/255; 715/257; 715/259; 715/752; 704/246; 704/270.1; 709/206

(58) Field of Classification Search .......... 715/200, 715/255, 256, 257, 271, 273, 727, 728, 733, 715/752, 808, 809; 704/1, 10, 231, 251, 704/270.1, 5, 7, E15.002, E15.009, E15.021, 704/E15.022, E15.026; 709/201, 202, 203, 709/206, 207, 217, 219, 220, FOR. 109, FOR. 110; 707/1, 10, 102, 2, 203, 3, 4, E17.005, E17.015, 707/E17.029, E17.039
See application file for complete search history.

(56) References Cited

U.S. PATENT DOCUMENTS

| | | | | |
|---|---|---|---|---|
| 5,678,053 A * | 10/1997 | Anderson | ............ | 704/1 |
| 5,797,122 A | 8/1998 | Spies | | |
| 6,374,224 B1 | 4/2002 | Horiguchi et al. | | |
| 6,941,264 B2 * | 9/2005 | Konopka et al. | ............ | 704/243 |
| 7,136,808 B2 * | 11/2006 | Jessee et al. | ............ | 704/10 |
| H2187 H | 4/2007 | Yuchimiuk | | |
| 7,337,115 B2 * | 2/2008 | Liu et al. | ............ | 704/246 |
| 2003/0036903 A1 * | 2/2003 | Konopka et al. | ............ | 704/249 |
| 2004/0010559 A1 * | 1/2004 | Han | ............ | 709/206 |
| 2005/0286705 A1 | 12/2005 | Contolini et al. | | |
| 2006/0136352 A1 * | 6/2006 | Brun et al. | ............ | 707/1 |
| 2008/0034044 A1 | 2/2008 | Bhakta et al. | | |
| 2008/0147397 A1 * | 6/2008 | Konig et al. | ............ | 704/246 |

FOREIGN PATENT DOCUMENTS

EP      01076329 A2    2/2001

OTHER PUBLICATIONS

Metze et al., "Comparison of Four Approaches to Age and Gender Recognition for Telephone Applications," Acoustics, Speech and Signal Processing, ICASSP 2007, IEEE, Apr. 2007, pp. IV-1089-IV-1092.*

(Continued)

*Primary Examiner*—Doug Hutton
*Assistant Examiner*—Maikhanh Nguyen
(74) *Attorney, Agent, or Firm*—Maxvalue IP, LLC

(57) ABSTRACT

The present invention, in one embodiment, aids the user during composition of emails/letters/documents with assistance for correct gender usage. In one example application, first an automated user information look-up process is initiated over centralized databases using the proper names mentioned in the composition. Once matches are found, gender-related information is retrieved and the composer is assisted with gender recognition tools while composing gender-sensitive statements. When mismatches between proper nouns and the corresponding adjectives/pronouns are found, this method proceeds with highlighting or otherwise flagging the mismatching words. Upon right-clicking the highlighted words, the user is given suggestions for the most probably correct options. Examples of the idea explained in this invention can be incorporated in existing software/systems of email/document editor/composers.

1 Claim, 6 Drawing Sheets

OTHER PUBLICATIONS

Parris et al., "Language Independent Gender Identification," Acoustics, Speech, and Signal Processing, ICASSP 1996, IEEE, May 1996, pp. 685-688.*

M. Schulze, "From the Developer to the Learner: Describing Grammar—Learning Grammar," the Journal of EUROCALL, vol. 11, No. 1, May 1999, pp. 117-124.*

* cited by examiner

PRIOR ART

To: kiran@in.ibm.com
CC: sandy@usibm.com
From: yantian@jp.ibm.com
Subject: Meeting is Canceled.

Kiran,
I was informed that Sandy is out of office. Her/His manager informed me that he/she was not feeling well. So the meeting is cancelled.

101

Sandy,
Kiran is the new customer representative. I was informed that she/he has some work experience in customer care. Her/his name was recommended by the head of the department. Let us know once you are back so that I can arrange your meeting with Kiran.

Thanks,
Yantian

FIG 1

To: kiran@in.ibm.com
CC: sandy@usibm.com
From: yantian@jp.ibm.com
Subject: Meeting is Canceled.

Kiran,

I was informed that Sandy is out of office. His manager informed me that he was not feeling well. So the meeting is cancelled.

Sandy,

Kiran is the new customer representative. I was informed that she has some work experience in customer care. Her name was recommended by the head of the department. Let us know once you are back so that I can arrange your meeting with Kiran.

Thanks,

Yantian

To: kiran@in.ibm.com
CC: sandy@usibm.com
From: yantian@jp.ibm.com
Subject: Meeting is Canceled.

Kiran,

I was informed that Sandy is out of office. His manager informed me that he was not feeling well. So the meeting is cance...

Sandy,

Kiran is...

that she...

Her/his...

departm...

arrange...

Thanks,
Yantian 301
309
307
303
305

Gender Assistance System

Information and assistance is provided for user with email ID:
sandy@us.ibm.com

Information:
Gender: Female

Grammar recommendation  >    ✓ She

FIG 3

GENDERS-USAGE ASSISTANT FOR COMPOSITION OF ELECTRONIC DOCUMENTS, EMAILS, OR LETTERS

BACKGROUND OF THE INVENTION

The commonly encountered problem while composing an email or document is knowledge of the gender of the particular person addressed in the email or document. Knowing the gender is important for composing grammatically-correct sentences. Imagine that a person attempts to write an email to a person whom the person does not know or have never met. Via names one can try and decide about the gender of the person. But identifying gender of a person via his/her name needs some knowledge of the culture/religion/language in which that particular name is present. In today's world where one interacts with users across the globe, it is not always possible for one to identify genders using names. For example, a person from Japan cannot find out if a person with Indian name "Sundar" is a male or female. Similarly, a person from India may not know if a person with Japanese name "Takatsu" is a male or female. Furthermore, there are few names which are common to both genders. For example, "Kiran" or "Radha" are names in India which are given to both male and female persons. Similarly, the name "Sandy" is a female name in some part of the world while it is a male name in some other part of the world.

With the above explanations in mind, imagine a situation where a person with the name of Yantian (yantian@jp.ibm.com) is writing an email to a user with the name "Kiran" (kiran@in.ibm.com) while keeping a person with the name "Sandy" (sandy@us.ibm.com) in loop. All three users are from diverse cultures with Kiran from India, Yantian from China and Sandy from the U.S. Yantian does not know their genders as he is interacting with them for the first time. Nor can he find out their genders from their names. Similarly, both Kiran and Sandy cannot find out each other's or Yantian's genders. This results in ambiguity or confusion to the composer while drafting the emails. One might make gender assumptions while drafting the email until later he/she realizes that a mistake has been made. This is a kind of a situation are not rare and are faced on day-to-day basis while current systems are unable to assist. This problem is not addressed in document editors such as MS Word® or Open Office®, or in email clients such as IBM Lotus Notes® or MS Office®.

SUMMARY OF THE INVENTION

The present invention, in one embodiment, aids the user during composition of emails/letters/documents with assistance for correct gender usage. In an example application, an automated user information look-up process is initiated first over centralized databases using the proper names mentioned in the composition. Once matches are found and gender-related information is retrieved, the composer is assisted with gender recognition tools while composing gender-sensitive statements involving pronouns such as he, she, his, her, him, etc. When mismatches between proper nouns and the corresponding adjectives/pronouns are found, this method proceeds with highlighting or otherwise flagging the mismatching words. Upon right-clicking the highlighted words, the user is given suggested or most probably correct options. In one embodiment, the idea explained in this invention, can be incorporated in existing software/systems of email/document editor/composers.

BRIEF DESCRIPTION OF THE DRAWINGS

FIG. 1 illustrates how the gender problem is addressed in the prior art.

FIG. 2 illustrates the automatic highlighting step (in Red or any other color) in an embodiment of this invention when a gender mismatch between the composition and the automatically obtained gender information is found.

FIG. 3 illustrates the pop-up box, presented by an embodiment of this invention, when the user clicks the highlighted content which represents a gender mismatch between the composition and the automatically obtained gender information.

DETAILED DESCRIPTION OF THE PREFERRED EMBODIMENTS

An embodiment of the present invention aids the user during composition of emails/letters/documents with assistance for correct gender usage. As shown in FIG. 1, there are instances (101) where the correct genders of the individuals are unknown. In an example application, the corresponding solution comprises of the following steps.

Figure 5:
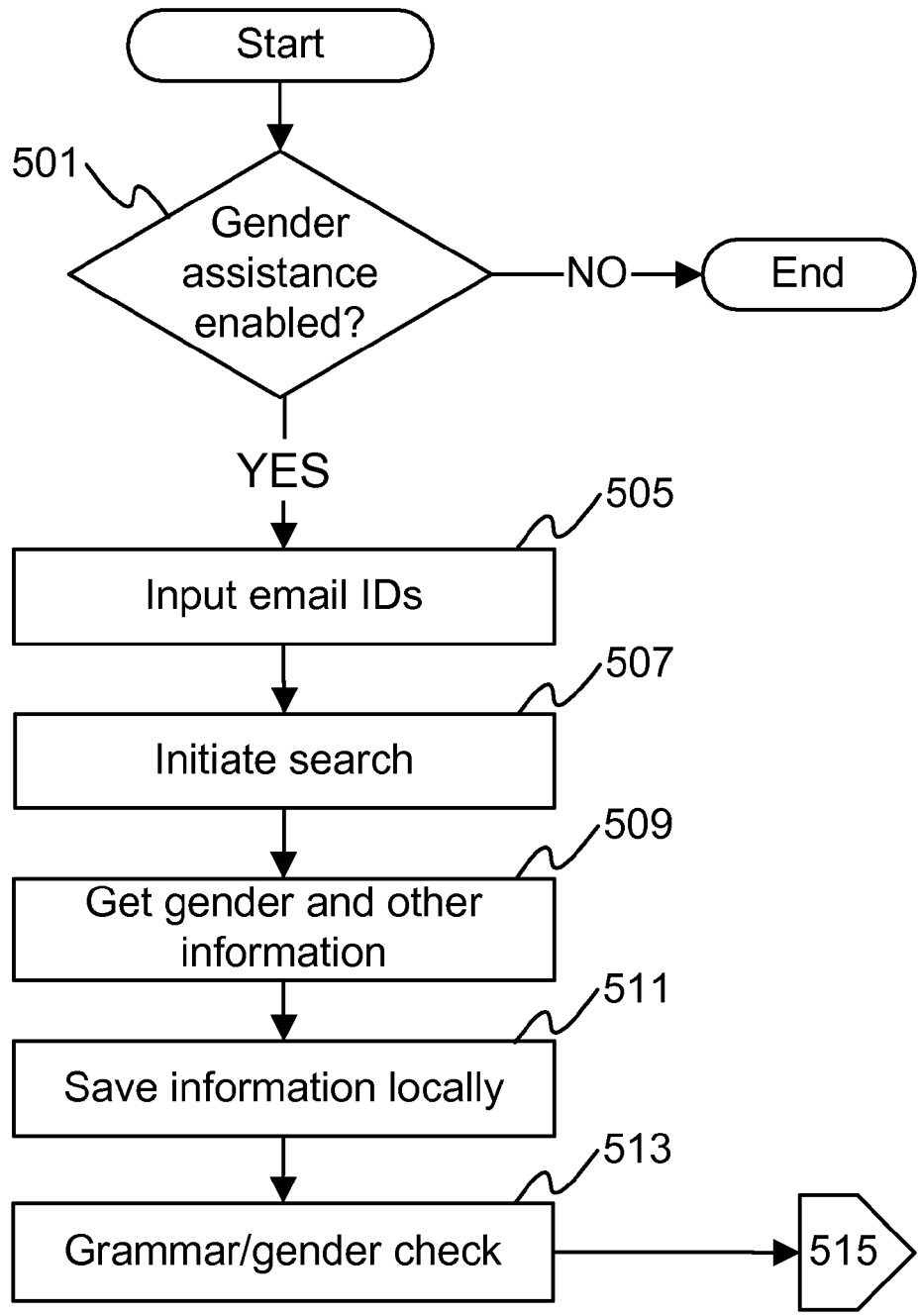
FIG. 5 shows a flow diagram of an embodiment of the present invention.

Step 1: In case the gender assistance is enabled (501 of FIG. 5), the automated user information look-up (507) of the correct word (201 of FIG. 2) is performed in centralized database (e.g. LDAP) where users' information including their genders is stored, a database similar to the company database where the employee information is hosted, or a centralized database of an email-service-provider (e.g. hotmail or gmail). These databases usually obtain the gender information of the user during user sign-up/registration using the users' email ID mentioned in the email/document (505) to learn the users gender (509). This information can be locally cached to prevent future remote look-ups for the same user (511).

Figure 6:
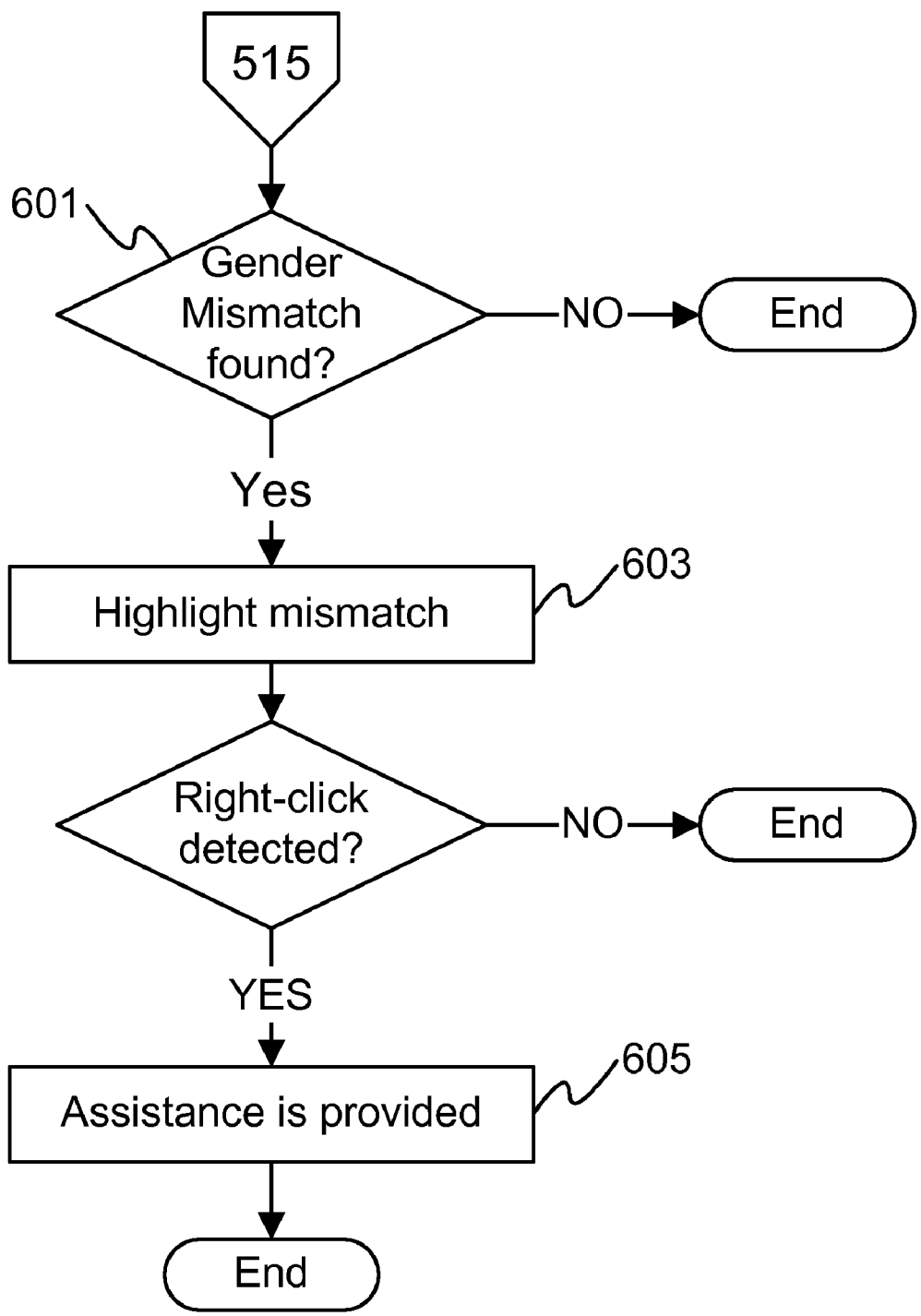
FIG. 6 shows the continuation of the flow diagram shown in FIG. 5.

Step 2: Use the above obtained gender knowledge (509) to assist the composer of the email/document while composing gender specific statements, involving words such as he, she, his, her, him, etc. After a grammar/gender check (513, 515) and upon detecting (601 of FIG. 6) a mismatch on the gender specific adjectives/pronouns entered by the composer with the gender knowledge information obtained in Step 1, the solution will provide assistance by highlighting (603) the mismatching gender specific words (201), comprising the mismatching possessive adjectives like his, her or other personal pronouns like he, she, him, hers, etc. The highlighting, or otherwise flagging, helps the user/composer realize that there is a mismatch with his/her knowledge of gender and the one obtained from the centralized database. In step 605, after right-clicking the highlighted gender specific words (301), the Gender Assistance System (GAS) puts forward several suggestions to the user in the form of a dialog box (307) about possible correct/relevant options, from which the user can select. The dialog box (307) will also display the email ID to which the system is referring to, to make the gender suggestion as shown in FIG. 3.

Step 3: Integrate the above steps into the email/document composer/editor (e.g. in IBM Lotus Notes®).

Additional scenarios embodiments and remarks:

Scenario 1: In a scenario shown in FIG. 3, the pronoun in the second sentence (309) has to be corrected in order to be properly tied to "Sandy" in the previous sentence. In any given paragraph/sentence having a proper noun, the pronouns (he, she, him, hers, etc.) following the proper noun will map to that particular proper noun itself. So in the example, the stated pronoun to be corrected ("his") follows a proper noun "Sandy" and hence refers to "Sandy." With this approach, the text parser while parsing a paragraph identifies a proper noun (where all names qualify to be proper nouns). Then, in the grammar recommendation module (303), it considers the stated pronouns (305) in relation to the proper noun previously detected until another proper noun is encountered. Therefore, in the above example, the parser will first encounter "Sandy" as the proper noun and hence all the following pronouns will be related to "Sandy".

Figure 4:
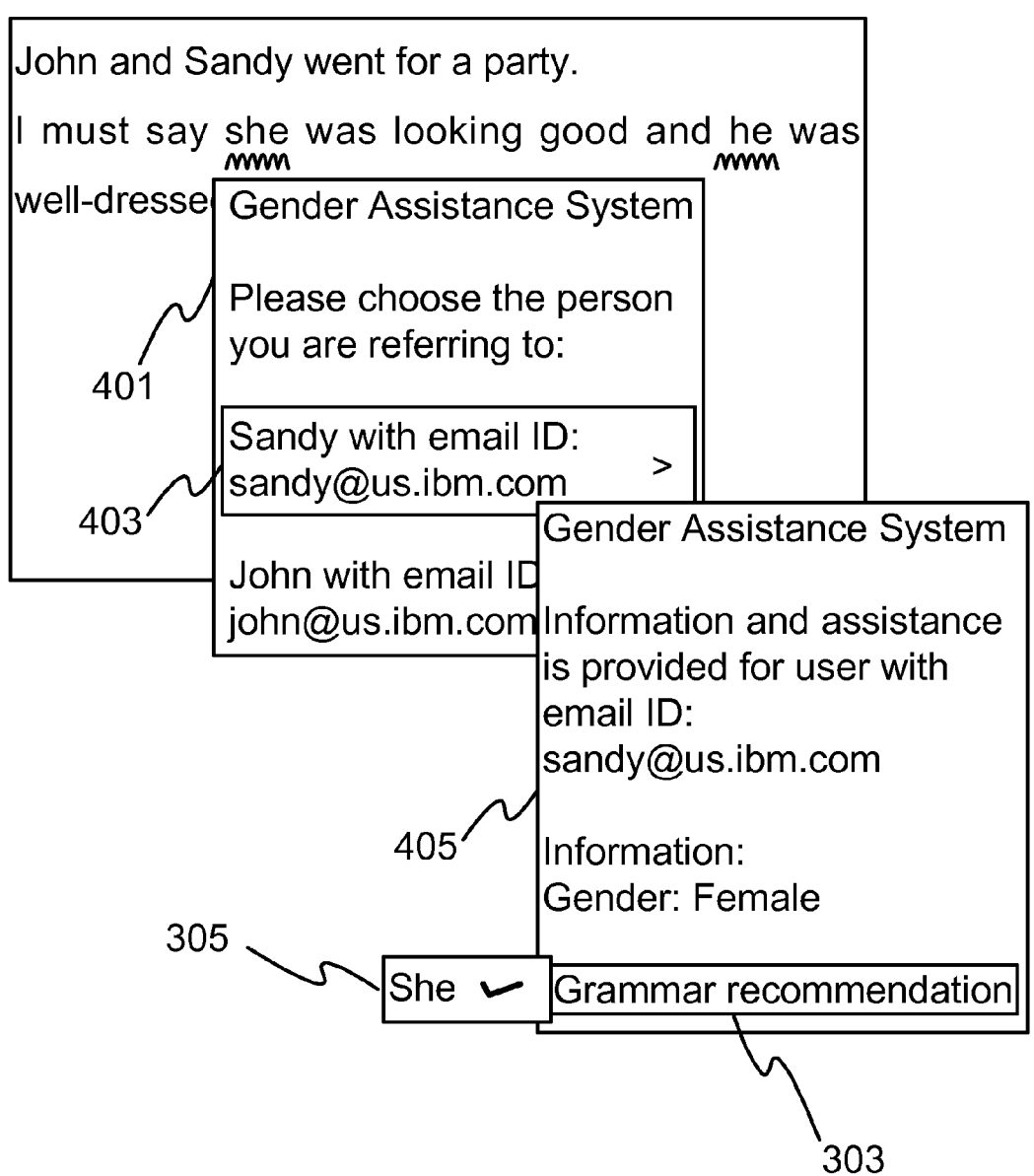
FIG. 4 shows the step in which the user right clicks on each pronoun after they are all highlighted, and is presented with a pop up window with a dialog box show-casing him/her with a list of users/proper nouns along with their gender which it has automatically fetched and their corresponding pronouns.

This works well if the paragraph has either a single proper noun or multiple proper nouns being mentioned with distinct context and sentences. But the following example illustrated in FIG. 4 shows a case where a paragraph composition has multiple proper nouns with its usage of pronouns intermingled in the same paragraph or sentence:

"John and Sandy went for a party. I must say she was looking good and he was well dressed."

For the parser to identify whether "he" in the second sentence is being referred to "Sandy" or to "John" is challenging. In this case, as per grammar rules, "she" in the second sentence should refer to the first proper noun mentioned in the first sentence. So the word "he" should indicate "Sandy". But in this scenario, it turns out that the user actually was referring to "John" by using "he".

To address this issue, an embodiment of invention provides some assistance for the email or document composer to use proper pronouns while it does not make this task automatic. In this case, both the pronouns "he" as well as "she" are highlighted and when the user right-clicks on any one of them, the user is popped up with an assisting dialog box with information of both "Sandy" as well as "John". The user has to select the person he is referring to and the system assists him with additional gender information as shown. Therefore, in the above mentioned and other similar cases, if the user opts to use the proposed gender assistance feature, an embodiment of invention takes the following approach:

Step 1: Has the user enabled the proposed gender assistance feature (similar to 501).

If Yes, then:

Step 2: For every composition with intermingled proper nouns or for solutions with no text parser intelligence requirement, identify all the pronouns used in the composition for example by highlighting them (301, 309) without associating or mapping the pronouns with the proper nouns.

Step 3: Referring to FIG. 4, when the user right-clicks (401) on any of the highlighted pronoun, the user will be presented with a dialog box such as a drop down menu (401) assisting the user with a list of all the proper nouns used in the email/document composition, their gender and the corresponding pronoun suggestions to be used. Since the user knows whom the user is addressing, the user will select the person whom the user is referring to (403) and another pop-up box (405) will help the user know the correct pronoun to use for the person identified by the selected proper noun.

An embodiment of this invention provides the composer with on-line user-friendly gender assistance which helps towards getting the composition correct.

Scenario 2: One embodiment addresses a scenario where the pronouns are not limited to people mentioned in the TO or CC list, as for example, in the following composition: "He is out of town and his manager said I should check with his team lead. I'll call her in a few minutes and let you know."

The above solution addresses most of the grammatically correct framed sentences. As per English Grammar, sentences such as "He is out of town and his manager said I should check with his team lead. I'll call her in a few minutes and let you know." qualify to be incorrect, unless the writer knows that the 'team lead' being referred to in the sentence is a female. If the composer is not aware of the gender, the recommended sentence should be framed as "He is out of town and his manager said I should check with his team lead. I'll call him/her in a few minutes and let you know." The proposed method is targeted for grammatically correct formed sentences and works well in those scenarios. Also in cases where the algorithm is not able to find out the gender, the disclosure clearly states that it leaves it to the composer to make the final call. Alternatively, for such scenarios, an embodiment of this invention prompts for person's name/email ID, whenever it cannot resolve the gender ambiguity.

In one embodiment, a method is presented for providing an automatic gender-usage assistant for composition of an electronic document. The method comprises of determining one or more proper nouns within a content of the electronic document where a first proper noun of the one or more proper nouns has a first gender attribute, prompting a user to enter a first email address for the first proper noun, looking up the first email address in a local database and retrieving a first gender information associated with the first email address if the first gender information is available in the local database, looking up the first email address in a centralized database and retrieving the first gender information from the centralized database if the first gender information is not available in the local database, and storing the first gender information in the local database if the first gender information is not available in the local database.

The procedure in this embodiment further comprises checking grammar of the content, determining all first referencing gender-specific portions of the content wherein the first referencing gender-specific portions comprise referencing gender-specific adjectives and referencing gender-specific personal pronouns that reference the first proper noun. The referencing gender-specific adjectives and the referencing gender-specific personal pronouns do not match the first gender information.

In this embodiment, all non-referencing gender-specific portions of the content are determined which comprise non-referencing gender-specific adjectives or non-referencing gender-specific personal pronouns that do not reference any one of the one or more proper nouns, and first referencing gender-specific portions and the non-referencing gender-specific portions within one or more portions of the content are indicated.

In one embodiment, if the user elects to get the automatic gender-usage assistant on a first referencing gender-specific portion of the first referencing gender-specific portions, then a first graphical user interface assistant is displayed wherein the first graphical user interface assistant comprises the first email address, the first gender information, and a first grammar recommendation. The first grammar recommendation is a first matching adjective or a first matching personal pronoun that corresponds to the first referencing gender-specific portion and matches the first gender information.

In one embodiment, if the user elects to take the first grammar recommendation on the first referencing gender-specific portion, then the first referencing gender-specific portion in the content is replaced by the first grammar recommendation, but if the user elects to get the automatic genders-usage assistant on a first non-referencing gender-specific portion of the non-referencing gender-specific portions, then a second graphical user interface aid is displayed. In one embodiment, the second graphical user interface aid comprises, for each of the one or more proper nouns, a second corresponding email address, a second corresponding gender information, and a second corresponding grammar recommendation, if the second corresponding email address and the second corresponding gender information are available. In one embodiment, the second corresponding grammar recommendation is a second matching adjective or a second matching personal pronoun that corresponds to the first non-referencing gender-specific portion and match the second corresponding gender information, and if the user elects to take the second corresponding grammar recommendation on the first non-referencing gender-specific portion, then the first non-referencing gender-specific portion in the content is replaced by the second corresponding grammar recommendation.

A system, apparatus, or device comprising one of the following items is an example of the invention: electronic documents, grammar checking module, email server, server, client device, PDA, mobile device, cell phone, storage to store the messages, router, switches, network, communication media, cables, fiber optics, physical layer, buffer, nodes, packet switches, computer monitor, or any display device, applying the method mentioned above, for the purpose of document correction and management.

Any variations of the above teaching are also intended to be covered by this patent application.

The invention claimed is:

1. A method for providing an automatic gender-usage assistant for composition of an electronic document, said method comprising:

determining one or more proper nouns within a content of said electronic document, wherein a first proper noun of said one or more proper nouns has a first gender attribute;

prompting a user to enter a first email address for said first proper noun;

looking up said first email address in a local database and retrieving a first gender information associated with said first email address, if said first gender information is available in said local database;

if said first gender information is not available in said local database, then looking up said first email address in a centralized database and retrieving said first gender information from said centralized database;

storing said first gender information in said local database, if said first gender information is not available in said local database;

checking grammar of said content;

determining all first referencing gender-specific portions of said content, wherein said first referencing gender-specific portions comprise referencing gender-specific adjectives and referencing gender-specific personal pronouns that reference said first proper noun, wherein said referencing gender-specific adjectives and said referencing gender-specific personal pronouns do not match said first gender information;

determining all non-referencing gender-specific portions of said content, wherein said non-referencing gender-specific portions comprise non-referencing gender-specific adjectives or non-referencing gender-specific personal pronouns that do not reference any one of said one or more proper nouns;

indicating said first referencing gender-specific portions and said non-referencing gender-specific portions within one or more portions of said content;

if said user elects to get said automatic gender-usage assistant on a first referencing gender-specific portion of said first referencing gender-specific portions, then displaying a first graphical user interface assistant, wherein said first graphical user interface assistant comprises said first email address, said first gender information, and a first grammar recommendation, wherein said first grammar recommendation is a first matching adjective or a first matching personal pronoun that corresponds to said first referencing gender-specific portion and match said first gender information;

if said user elects to take said first grammar recommendation on said first referencing gender-specific portion, then replacing said first referencing gender-specific portion in said content by said first grammar recommendation;

if said user elects to get said automatic gender-usage assistant on a first non-referencing gender-specific portion of said non-referencing gender-specific portions, then displaying a second graphical user interface aid, wherein said second graphical user interface aid comprises, for each of said one or more proper nouns, a second corresponding email address, a second corresponding gender information, and a second corresponding grammar recommendation, if said second corresponding email address and said second corresponding gender information are available, wherein said second corresponding grammar recommendation is a second matching adjective or a second matching personal pronoun that corresponds to said first non-referencing gender-specific portion and match said second corresponding gender information; and if said user elects to take said second corresponding grammar recommendation on said first non-referencing gender-specific portion, then replacing said first non-referencing gender-specific portion in said content by said second corresponding grammar recommendation.

* * * * *